United States Patent [19]
Schlatter

[11] 3,715,201
[45] Feb. 6, 1973

[54] APPARATUS FOR ELECTROSLAG MELTING

[75] Inventor: Rene Schlatter, Derry Township, Westmoreland County, Pa.

[73] Assignee: Latrobe Steel Company

[22] Filed: Sept. 30, 1970

[21] Appl. No.: 76,761

[52] U.S. Cl. .............................75/10, 75/94, 148/26, 164/252
[51] Int. Cl. .........C22d 7/00, C22b 9/10, B23k 35/34
[58] Field of Search ..........75/10, 11, 94; 148/26, 24; 164/49, 252; 13/34

[56] References Cited

UNITED STATES PATENTS

| | | | |
|---|---|---|---|
| 3,469,968 | 9/1969 | Snow | 75/10 R |
| 3,139,654 | 7/1964 | Harris | 75/10 R |
| 3,129,473 | 4/1964 | Veil | 164/252 |
| 3,104,996 | 9/1963 | Boddey | 148/24 |

FOREIGN PATENTS OR APPLICATIONS

| | | | |
|---|---|---|---|
| 1,523,587 | 3/1968 | France | 75/10 R |
| 1,126,434 | 5/1968 | Great Britain | 75/10 R |
| 1,169,271 | 10/1969 | Great Britain | 75/10 R |
| 1,169,071 | 5/1969 | Great Britain | 75/10 R |

Primary Examiner—Winston A. Douglas
Assistant Examiner—Peter D. Rosenberg
Attorney—Buell, Blenko & Ziesenheim

[57] ABSTRACT

A consumable electrode electroslag apparatus and method are provided in which an ingot mold rests on a conductive stool and an electrode to be remelted is lowered into the mold to contact and arc against a vertical ignition pin on a starting plate resting on the stool and surrounded by an exothermic flux confined within a consumable cylinder which is in turn surrounded by a mixture of a standard working flux.

7 Claims, 3 Drawing Figures

INVENTOR
Rene Schlatter

Arc Start

Exothermic Start

APPARATUS FOR ELECTROSLAG MELTING

This invention relates to methods and apparatus for electroslag melting and particularly to a method and apparatus for starting electroslag or electroflux melting.

Electroslag melting has been practiced for a considerable period of time. In the electroslag melting technique, an electrode formed by casting, rolling, forging or powder metallurgy techniques which requires further refining to produce a desired metal quality is employed as a consumable electrode. The lower end of such electrode is submerged in a bath of molten conductive slag contained in an ingot mold in which the electrode is melted. Resistance heating of the slag or flux is achieved by maintaining a current flow from the electrode through the flux to a stool on which the mold is set. By proper electrical control of the current passing through the slag the temperature of the slag or flux is maintained above the melting point of the metal of the electrode and the electrode portion submerged in the molten slag melts and passes through the slag blanket into a molten metal pool which cools to form the final refined ingot of desired quality. The flux or slag blanket acts to refine the steel which passes through it as well as serving as the electrical conductor between the electrode and stool.

It is in this latter capacity as a conductor that problems have arisen. One of the more difficult of these problems has been the difficulty in initiating the melting process. It is very difficult to start the melting process with the dry pulverulent slag components in the bottom of the mold because they act as a refractory insulator. It is equally difficult to melt the slag outside the ingot mold for the consumable electrode and pour it into the mold and still retain it in a satisfactory condition.

I have found that this problem can be vastly simplified by the use of the apparatus and method herein disclosed and that the high starting forces heretofore required can be minimized.

Preferably I provide in a consumable electrode apparatus having an ingot mold, a stool carrying the mold and an electrode within the mold the improvement comprising a starting plate seated on and contacting said stool, a vertical ignition pin extending vertically upwardly on said starting plate, a consumable cylinder surrounding the starting plate and extending vertically upwardly to the level of the ignition pin top and a flux consisting essentially of a major portion of an oxygen supplying compound such as potassium nitrate, sodium nitrate, a permanganate, a perchlorate or the like and a minor portion of a mixture of magnesium powder, aluminum powder and an alkali metal flouride, mixed with working flux, surrounding said ignition pin and filling the area defined by the consumable cylinder between the starting plate and the top of the ignition pin and a layer of flux within the area between the consumable cylinder and the mold wall consisting of a selected working flux. The flux is fused by lowering the electrode to be melted into the mold until an arc is formed between the ignition pin and the electrode. This fuses the pin and ignites the exothermic flux surrounding it and the electrode then continues to melt the slag or flux to form quickly the slag pool after which it begins to melt itself by resistance melting in the normal fashion of electroslag melting. The consumable cylinder is preferably formed of paper. The starting plate and pin are preferably of the same metal as the ingot to be melted.

In the foregoing general description I have set out certain problems to be solved, and certain objects, purposes and advantages of this invention. Other objects, purposes and advantages of the invention will be apparent from a consideration of the following description and the accompanying drawings in which.

Figure 1:
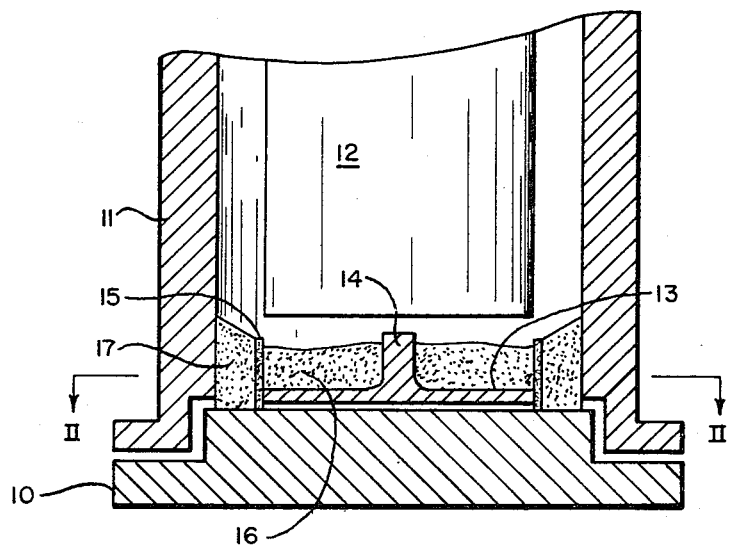
FIG. 1 is a fragmentary section of a consumable electrode mold with a flux and starting plate according to my invention.
Figure 2:
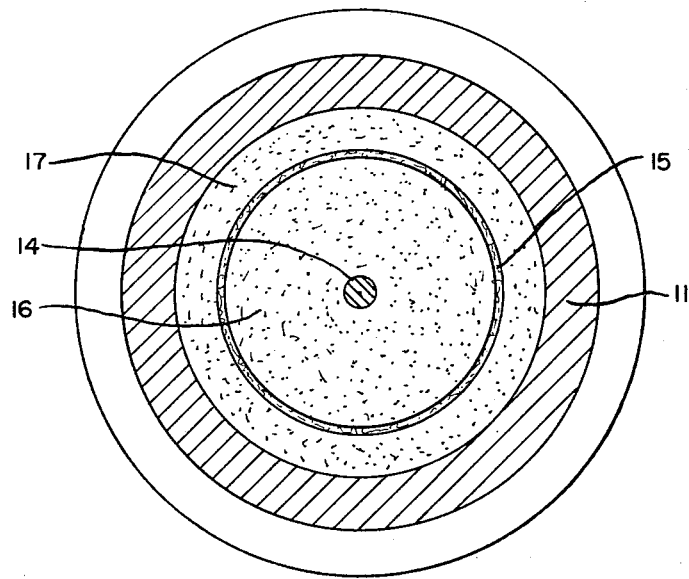
FIG. 2 is a section on the line II—II of FIG. 1.

Referring to the drawings I have illustrated a stool 10 and mold 11 typical of electroslag remelt operations. An ingot 12 which acts as the electrode is suspended axially of the mold 11 by the usual apparatus used in consumable electrode electroslag remelt techniques and this apparatus is conventional and therefore not illustrated. A starter plate 13 is centered on stool 10. A vertically extending ignition pin 14 is provided centrally of plate 13. The starting plate 13 is surrounded by a cardboard cylinder 15. The area within cylinder 15 surrounding pin 14 is filled with a mixture of exothermic starting flux and working flux 16. The exothermic starting flux is preferably about 61% $KNO_3$, about 16.5% Mg powder, about 17.5% Al powder and about 5% KF. This exothermic starting flux can vary somewhat from the preferred amounts within the range of about 58 to 65% $KNO_3$, about 15 to 18% Mg powder, about 16 to 19% Al powder and about 4 to 6% KF. The starting mixture is preferably made up of 60 percent of a selected standard working flux and 40 percent of the above described exothermic flux. A working flux mixture 17 surrounds the paper cylinder 15.

The remelt operation is started by lowering the ingot electrode 12 down to the ignition pin 14 starting an arc which fuses pin 14 and ignites the starting flux 16 which is exothermic in character. This melts the flux 16, consumes the cylinder 15 and melts flux 17 to form a pool of molten flux which then proceeds to act as is normal for consumable electroslag remelt operations, i.e., the electrode 12 is resistance melted in the molten slag and is deposited within the mold walls 11 to form an ingot of desired character.

Figure 3:
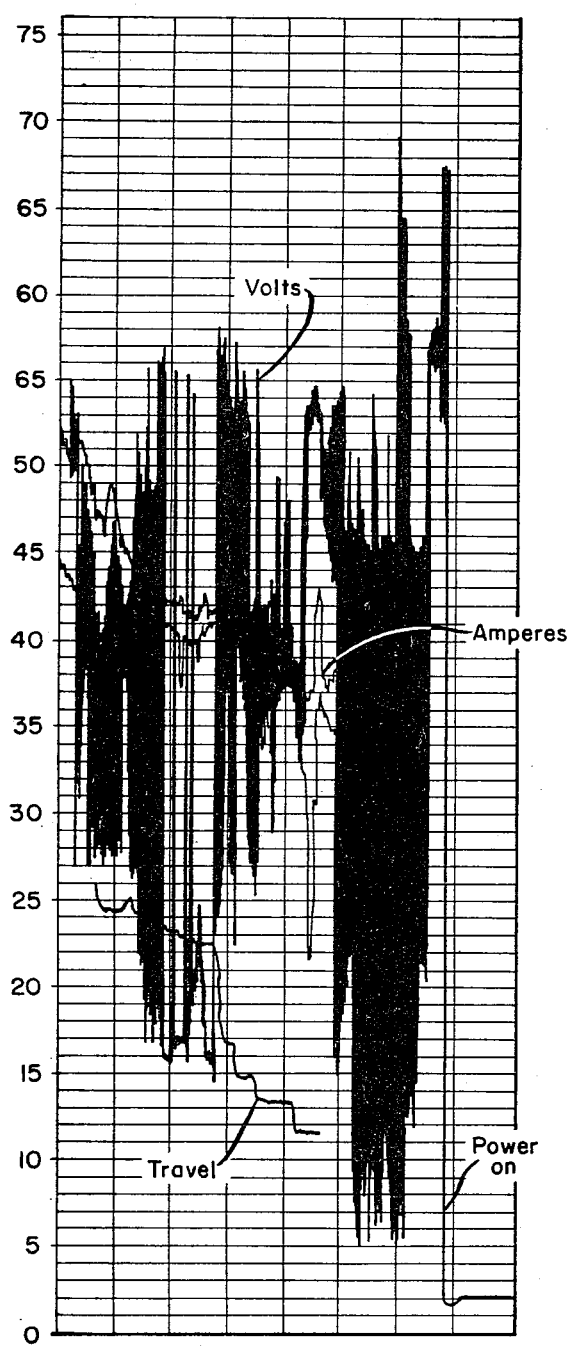
FIG. 3 is a graph showing the improvement in start up using this invention.
Figure 3:
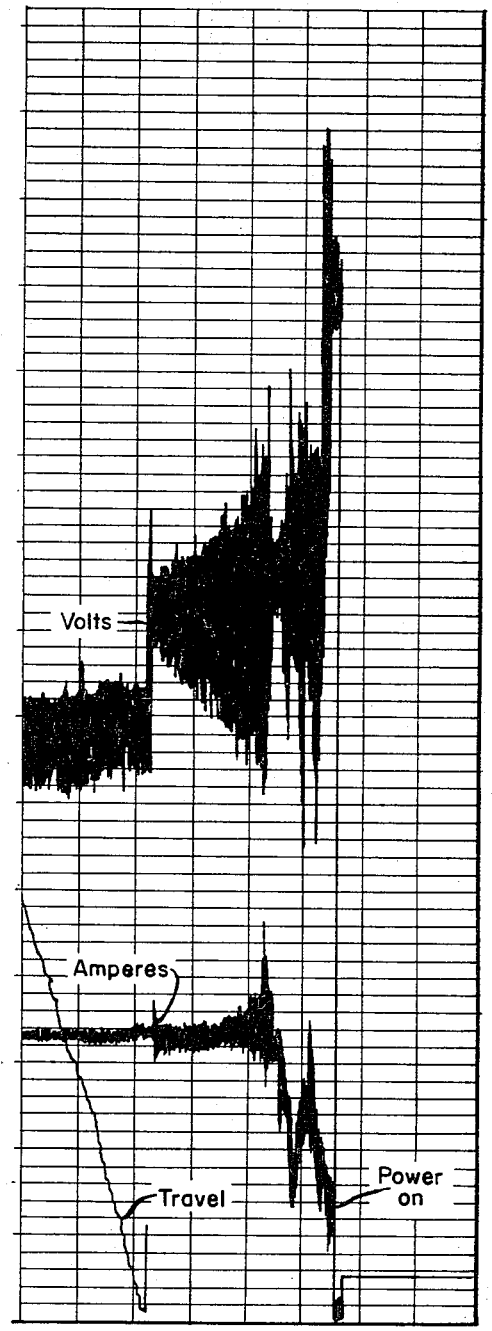

In FIG. 3 I have shown the marked improvement which results in start up by the use of the practice of this invention.

In the foregoing specification I have illustrated and described certain preferred embodiments and practices of my invention. It will be understood, however, that this invention may be otherwise practiced within the scope of the appended claims.

I claim:

1. In a consumable electrode electroslag apparatus having an ingot mold, a stool carrying the mold and an ingot electrode to be melted within the mold the improvement comprising a starting plate seated on and contacting said stool, a vertical ignition pin extending vertically upwardly on said starting plate toward the electrode, a consumable annulus surrounding the starting plate and extending vertically upwardly to the level of the ignition pin top, and an exothermic starting flux consisting essentially of about 50 to 65% $KNO_3$, about 15 to 18 percent of magnesium metal powder, about 16 to 19 percent aluminum metal powder and about 4 to 6 percent of an alkali metal fluoride surrounding said ignition pin and filling the area within and defined by the consumable annulus between the starting plate and the top of the ignition pin.

2. An apparatus as claimed in claim 1 wherein the area between the consumable cylinder and the mold wall is filled with a flux consisting of a selected working flux.

3. In a consumable electrode electroslag apparatus having an ingot mold, a stool carrying the mold and an ingot electrode to be melted within the mold the improvement comprising a starting plate seated on and contacting said stool, a vertical ignition pin extending vertically upwardly on said starting plate toward the electrode, a consumable annulus surrounding the starting plate and extending vertically upwardly to the level of the ignition pin top, and an exothermic starting flux consisting essentially of about 61% $KNO_3$, about 16.5 percent magnesium metal powder, about 17.5 percent aluminum metal powder and about 5% KF surrounding said ignition pin and filling the area within and defined by the consumable annulus between the starting plate and the top of the ignition pin.

4. An apparatus as claimed in claim 1 wherein the consumable cylinder is made of paper.

5. An apparatus as claimed in claim 1 wherein the starting plate and ignition pin are made of the same composition as the ingot electrode to be melted.

6. A starting plate and ignition pin for electroslag remelting comprising a plate of metal having the outline of a mold in which it is to be used and a vertically upstanding pin in the center thereof.

7. A starting plate as claimed in claim 1 wherein the metal plate is circular having a diameter smaller than the diameter of an ingot mold in which it is to be used.

* * * * *